United States Patent
Takahashi et al.

(10) Patent No.: US 9,553,322 B2
(45) Date of Patent: Jan. 24, 2017

(54) FUEL CELL SYSTEM AND OPERATION METHOD THEREOF

(75) Inventors: Manabu Takahashi, Shiga (JP); Motomichi Katou, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 439 days.

(21) Appl. No.: 14/009,105

(22) PCT Filed: Jan. 27, 2012

(86) PCT No.: PCT/JP2012/000529
§ 371 (c)(1),
(2), (4) Date: Sep. 30, 2013

(87) PCT Pub. No.: WO2012/132181
PCT Pub. Date: Oct. 4, 2012

(65) Prior Publication Data
US 2014/0030619 A1  Jan. 30, 2014

(30) Foreign Application Priority Data

Mar. 30, 2011 (JP) ................. 2011-075057

(51) Int. Cl.
*H01M 8/06* (2016.01)
*H01M 8/04* (2016.01)

(52) U.S. Cl.
CPC ....... *H01M 8/0606* (2013.01); *H01M 8/04164* (2013.01); *H01M 8/04955* (2013.01); *H01M 8/04022* (2013.01); *Y02E 60/50* (2013.01)

(58) Field of Classification Search
CPC .................. H01M 8/0606; H01M 8/04014

(Continued)

(56) References Cited

U.S. PATENT DOCUMENTS

| 2005/0129990 A1* | 6/2005 | Ozeki ............... H01M 8/04231 429/423 |
| 2007/0212582 A1 | 9/2007 | Ohara et al. |
| 2007/0248856 A1 | 10/2007 | Ueda et al. |

FOREIGN PATENT DOCUMENTS

| JP | 08-066681 A | 3/1996 |
| JP | 2000-203803 A | 7/2000 |

(Continued)

OTHER PUBLICATIONS

International Search Report issued in International Application No. PCT/JP2012/000529 with Date of mailing Apr. 24, 2012.

(Continued)

*Primary Examiner* — Stewart Fraser
*Assistant Examiner* — Rachel L Zhang
(74) *Attorney, Agent, or Firm* — McDermott Will & Emery LLP

(57) ABSTRACT

A fuel cell system includes a fuel processor; a fuel cell stack; a first water tank; a combustor; a water discharge passage connected to a water drain port formed in the first water tank to discharge the water from inside of the first water tank; a water filling detector configured to detect that at least one of the water drain port and the water discharge passage is filled with water; a water supply unit for supplying the water to the first water tank; and a controller configured to execute a water filling step of supplying the water to the first water, supply the combustible gas to the combustor via the first water tank and cause the combustor to combust the combustible gas, when the water filling detector detects that at least one of the water drain port and the water discharge passage is filled with water.

12 Claims, 8 Drawing Sheets

(58) Field of Classification Search
USPC .......................................................... 429/423
See application file for complete search history.

(56) References Cited

FOREIGN PATENT DOCUMENTS

| | | |
|---|---|---|
| JP | 2004-199977 A | 7/2004 |
| JP | 2006-107893 A | 4/2006 |
| JP | 2006-147264 A | 6/2006 |
| JP | 2010-067494 A | 3/2010 |
| JP | 2011-18534 A | 1/2011 |

OTHER PUBLICATIONS

European Search Report issued in European Application No. 12762902.0-1359 dated Aug. 19, 2014.

\* cited by examiner

FUEL CELL SYSTEM AND OPERATION METHOD THEREOF

RELATED APPLICATIONS

This application is a national phase application of the U.S. National Phase under 35 U.S.C. §371 of International Application No. PCT/JP2012/000529, filed on Jan. 27, 2012, which in turn claims the benefit of Japanese Application No. 2011-075057, filed on Mar. 30, 2011, the disclosures of which Applications are incorporated by reference herein.

TECHNICAL FIELD

The present invention relates to a fuel cell system for generating electric power using a fuel gas and an oxidizing gas, and an operation method thereof.

BACKGROUND ART

In recent years, awareness of conservation of global environment has been increasing more and more, and an attention has been paid to a fuel cell system including a fuel cell stack which is capable of supplying high-efficient energy (at least one of electric power and heat) as a product which contributes to the conservation of global environment. Such a fuel cell system includes a fuel processor to generate a fuel gas containing hydrogen.

The fuel processor is supplied with a raw material gas (e.g., natural gas, propane gas, etc.) and water and generates the fuel gas containing hydrogen through a reforming reaction between the raw material gas and water in a reforming catalyst stored in the fuel processor. The generated fuel gas is supplied to an anode of the fuel cell stack. An oxidizing gas (e.g., air or oxygen supplied from an oxygen tank) containing oxygen is supplied to a cathode of the fuel cell. The fuel cell stack carries out power generation by reacting hydrogen and oxygen electrochemically, thereby generating electric power and heat.

The water used in the reforming reaction in the fuel processor is stored in a water tank. The water is supplied from the water tank to the fuel processor. Before the fuel cell system carries out power generation for the first time after it is installed, tap water (city water) is supplied from outside to the water tank.

There has been proposed a fuel cell system having a water-filling mode (corresponding to "water-filling step" of the subject application) in which a water storage unit (corresponding to "first water tank" of the subject application) including a cooling water storage unit for storing cooling water for the fuel cell system is filled automatically with water from outside (see e.g., Patent Literature 1). In the fuel cell system disclosed in Patent Literature 1, a method is employed in which, when the fuel cell system is installed, the water filling mode is executed before carrying out a power generation operation, and the fuel cell system is started-up and starts power generation after filling of the water in the water storage unit and its pipes is completed.

CITATION LIST

Patent Literature

Patent Literature 1: Japanese Laid-Open Patent Application Publication No. 2006-107893

SUMMARY OF INVENTION

Technical Problem

A service person who has knowledge necessary to perform maintenance of the fuel cell system and install the fuel system conducts a test operation (test run) including this water-filling mode. In the above mentioned conventional configuration, after the water-filling mode is completed, the service person conducts the test operation such as a start-up step and a power generation step of the fuel cell system. Because of this, time for the service person to finish the water-filling mode and the test operation increases. This causes problems that the number of fuel cell systems which can be installed in one day is limited, service time including the test operation increases, user's cost increases, etc.

When the user uses the fuel cell system after the fuel cell system has been installed or maintenance of the fuel cell system has been carried out, water is supplied to the water tank if the water is running short. In this case, if start-up of the fuel cell system is started after supplying of the water to the water tank is completed, it takes time until the fuel cell system starts power generation.

The present invention has been made to solve the above mentioned problem associated with the prior art, and an object is to provide a fuel cell system and an operation method thereof, which are capable of carrying out a power generation operation (or test operation) including a water filling step of supplying water used in a reforming reaction to a water tank, in a shorter time and more efficiently than the conventional configuration.

Solution to Problem

In view of the above mentioned problem associated with the prior art, the present inventors intensively studied, and discovered that after a water level inside of the water tank has reached a first level which is a water level at which at least one of a water drain port of a water tank and a water discharge passage which is between the water drain port and a water discharge unit, is filled with the water, supplying of a combustible gas to a fuel processor can be started, even when the water filling step is not completed, and as a result, construed the subject invention.

A fuel cell system of the present invention comprises a fuel processor for generating a fuel gas through a reforming reaction between a raw material gas and water; a fuel cell stack for generating electric power using a fuel gas generated in the fuel processor and an oxidizing gas; a first water tank for storing water used in at least a reforming reaction in the fuel processor; a combustor for combusting a combustible gas supplied via the first water tank to heat the fuel processor; a water discharge passage connected to a water drain port formed in the first water tank to discharge the water from inside of the first water tank; a water filling detector configured to detect that at least one of the water drain port and the water discharge passage is filled with water; a water supply unit for supplying the water to the first water tank; and a controller configured to, before power generation is performed in the fuel cell stack, execute a water filling step of supplying the water to the first water tank by activating the water supply unit, supply a combustible gas to the combustor via the first water tank and cause the combustor to combust the combustible gas, when the water filling detector detects that at least one of the water drain port and the water discharge passage is filled with water, in the water filling step.

In this configuration, the power generation operation (or test operation) can be started in a state in which the combustible gas supplied to the fuel processor does not leak to outside from the water drain port of the water tank via the water discharge passage. Thus, the power generation operation (or test operation) including the water filling step for supplying the water used in the reforming reaction to the first water tank can be carried out in a shorter time and more efficiently, than the conventional fuel cell system.

The fuel cell system of the present invention may further comprise an electric heater disposed on an outer periphery of the fuel processor to heat the fuel processor; wherein the combustor may be disposed inward relative to a reforming catalyst provided in the fuel processor; and wherein the controller may cause electric power to be supplied to the electric heater when supplying of the water to the first water tank starts and before the combustor performs combustion.

In this configuration, before completing filling of all of the water, the temperature of the fuel processor can be raised quickly, and time that passes from the water filling step until the test operation is completed can be reduced.

The fuel cell system of the present invention may further comprise: a reforming water supply passage connecting the fuel processor to the first water tank; and a connecting port at which the reforming water supply passage is connected to the water tank may be positioned above the water drain port.

In the fuel cell system of the present invention, the controller may cause the fuel cell stack to start power generation after the water filling step is completed.

In this configuration, even when the water supply unit is unable to supply the water sufficiently and the time for filling of the water increases, in a case where the water filling step and the start-up step and the power generation step of the power generation operation (or test operation) are performed at the same time, the power generation operation can be carried out safely.

According to the present invention, there is provided a method of operating a fuel cell system, including: a fuel processor for generating a fuel gas through a reforming reaction between a raw material gas and water; a fuel cell stack for generating electric power using a fuel gas generated in the fuel processor and an oxidizing gas; a first water tank for storing water used in at least a reforming reaction in the fuel processor; and a combustor for combusting a combustible gas supplied via the first water tank to heat the fuel processor; the fuel cell system further including: a water discharge passage connected to a water drain port formed in the first water tank to discharge the water from inside of the first water tank; a water supply unit for supplying the water to the first water tank; and a water filling detector configured to detect that at least one of the water drain port and the water discharge passage is filled with water; the method comprising: before power generation is performed in the fuel cell stack, executing a water filling step of supplying the water to the first water tank by activating the water supply unit, and supplying a combustible gas to the combustor via the first water tank to cause the combustor to combust the combustible gas, when the water filling detector detects that at least one of the water drain port and the water discharge passage is filled with water, in the water filling step.

In this method, the power generation operation (or test operation) can be started in a state in which the combustible gas supplied to the fuel processor does not leak to outside from the water drain port of the water tank via the water discharge passage. Thus, the test operation including the water filling step for supplying the water used in the reform-ing reaction to the water tank can be carried out in a shorter time and more efficiently, than the conventional fuel cell system.

Advantageous Effects of Invention

A fuel cell system and an operation method thereof of the present invention can carry out the power generation operation (or test operation) including the water filling step for supplying the water used in the reforming reaction to the water tank in a shorter time and more efficiently, than the conventional fuel cell system.

DESCRIPTION OF EMBODIMENTS

Hereinafter, preferred embodiments of the present invention will be described with reference to the drawings. Throughout the drawings, the same or corresponding components are designated by the same reference symbols, and will not be described in repetition. In addition, throughout the drawings, components required to describe the present invention are depicted and the other components are not illustrated. Moreover the present invention is not limited to the embodiments below.

Embodiment 1

Figure 1:
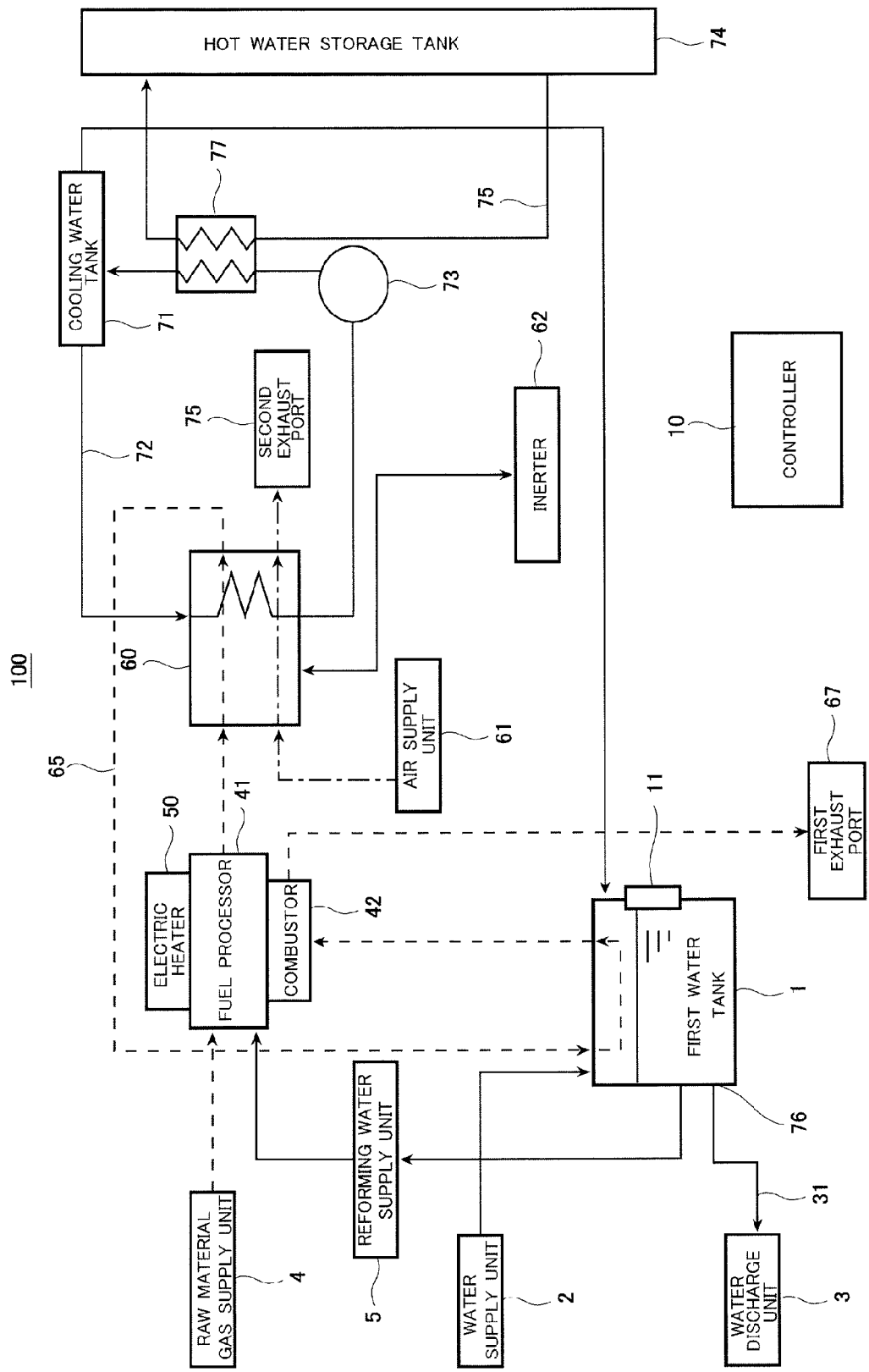
FIG. 1 is a block diagram showing a schematic configuration of a fuel cell system according to Embodiment 1.
Figure 2:
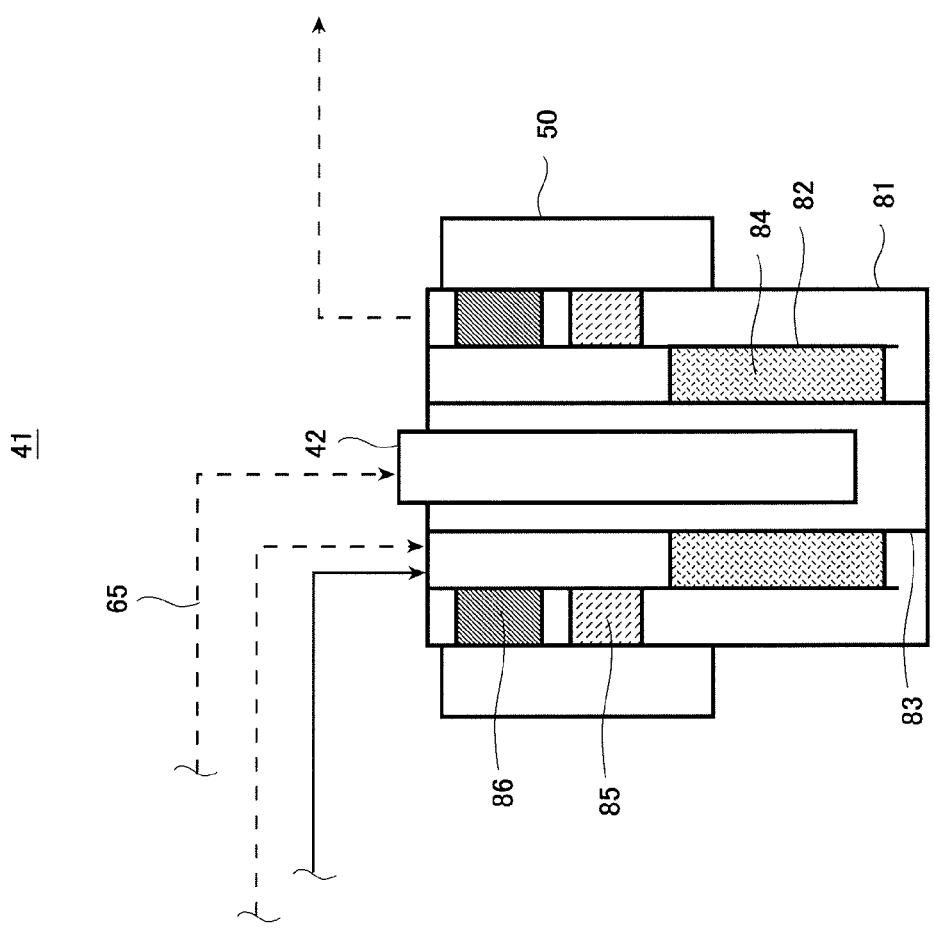
FIG. 2 is a view showing a schematic configuration of a fuel processor and a combustor in the fuel cell system of FIG. 1.
Figure 3:
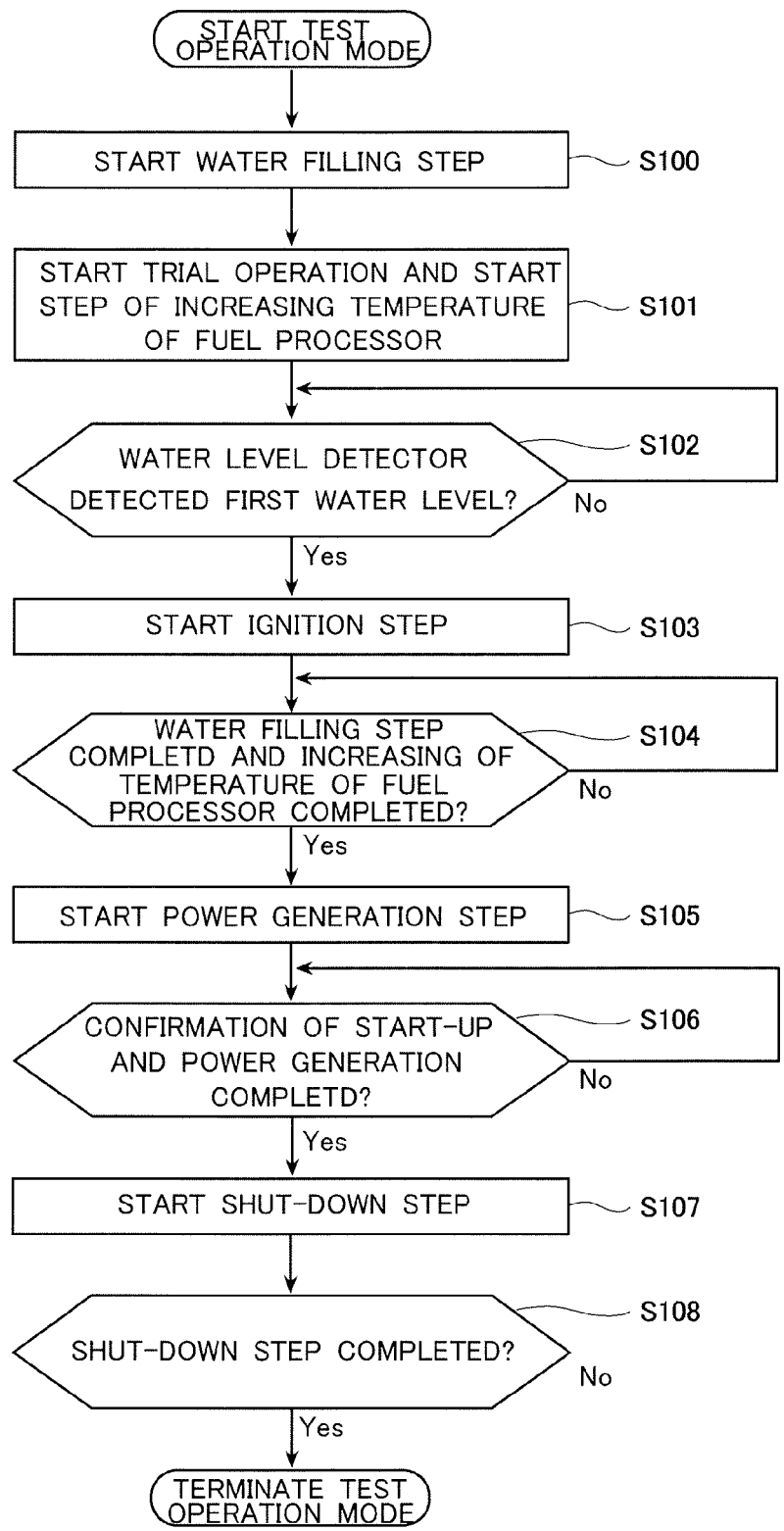
FIG. 3 is a flow diagram showing an operation method of the fuel cell system according to Embodiment 1.
Figure 4:
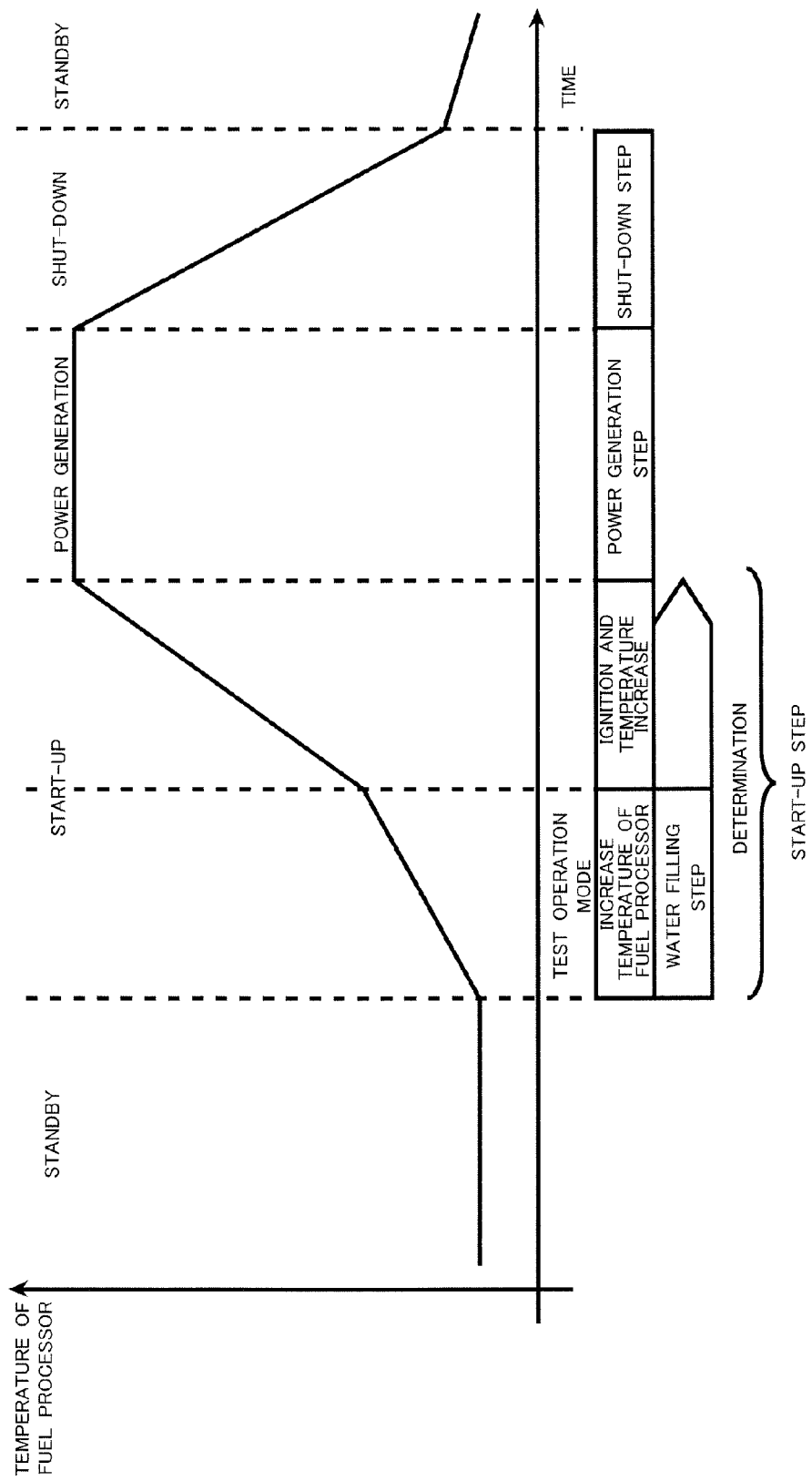
FIG. 4 is a chart showing a relationship between a step of an operation of the fuel cell system according to Embodiment 1, and a temperature of a fuel processor.

FIG. 1 is a block diagram showing a schematic configuration of a fuel cell system according to Embodiment 1. FIG. 2 is a view showing a schematic configuration of a fuel processor and a combustor in the fuel cell system of FIG. 1. FIG. 3 is a flow diagram showing an operation method of the fuel cell system according to Embodiment 1. FIG. 4 is a chart showing a relationship between a step of an operation of the fuel cell system according to Embodiment 1, and a temperature of the fuel processor.

First of all, the schematic configuration of a fuel cell system 100 according to Embodiment 1 of the present invention will be described with reference to FIGS. 1 and 2.

As shown in FIG. 1, the fuel cell system 100 includes a fuel processor 41 for generating a fuel gas through a reforming reaction between water and a raw material gas supplied by a raw material gas supply unit 4 via a pipe of a natural gas or a pipe connected to a LPG tank.

The fuel processor 41 is heated by heat generated by combusting a combustible gas in the combustor 42. Alternatively, an electric heater 50 may be placed in contact with the fuel processor 41, and a controller 10 may control the electric heater 50, to heat the fuel processor 41.

The fuel gas containing hydrogen generated in the fuel processor 41, as a major component, is supplied to an anode of a fuel cell stack 60. In addition, an air supply unit 61 supplies air as an oxidizing gas from atmospheric air outside of the fuel cell system 100, to a cathode of the fuel cell stack 60.

The fuel cell stack 60 includes a plurality of cells each of which includes the anode, the cathode, and an electrolyte sandwiched between the anode and the cathode. The fuel cell stack 60 further includes a plurality of separators each of which is placed between the cells. Each of the separators is provided with a fuel gas channel through which the fuel gas flows and an air supply channel through which the air supplied by the air supply unit 61 flows.

In the fuel cell stack 60, the fuel gas and oxygen in the air are electrochemically reacted with each other, and as a result, electric power and heat are generated.

The electric power generated in the fuel cell stack 60 is subjected to conversion from DC power to AC power by an inverter 62, and its pressure is boosted. Then, the AC power is supplied to home power loads such as a television and a laundry machine, via a power supply utility.

The heat generated in the fuel cell stack 60 is cooled by cooling water supplied from a cooking water tank 71 via a cooling water circulation passage 72 by activating a cooling water circulation unit 73, so that the fuel cell stack 60 is maintained at a temperature suitable for a power generation reaction. The cooling water which has absorbed the heat in the fuel cell stack 60 and has become a high-temperature state, exchanges heat in a heat exchanger 77 with hot water flowed from a hot water storage tank 74 via a hot water circulation passage 75. The heated hot water is stored as hot water in the hot water storage tank 74. The user utilizes the hot water in the hot water storage tank 74, in a bath or a kitchen.

An off-oxidizing-gas discharged from an air supply passage in the fuel cell stack 60 is discharged through a second exhaust port 70 formed in a casing accommodating various components (fuel cell stack 60, fuel processor 41, first water tank 1, inverter 62, etc.) in the fuel cell system 100.

An off-fuel-gas discharged from a fuel gas passage in the fuel cell stack 60 is supplied to the first water tank 1 via an off-fuel-gas passage 65. The off-fuel-gas is cooled while flowing through the off-fuel-gas passage 65 or in the first water tank 1, so that steam in the off-fuel-gas is condensed into water which is stored in the first water tank 1. Then, the off-fuel-gas with a lowered humidity is supplied to the combustor 42, which combusts the off-fuel-gas. By the combustion performed by the combustor 42, the fuel processor 41 is heated up to a temperature at which the reforming reaction or the like can occur in the fuel processor 41, and is maintained at a suitable temperature.

Then, a flue gas generated by the combustion performed by the combustor 42 is discharged to outside the casing through a first exhaust port 67 formed in the casing.

The water stored in the first water tank 1 is supplied to the fuel processor 41 by a reforming water supply unit 5, and used in the reforming reaction of the raw material gas such as a natural gas. It should be noted that impurities are removed from the water in the first water tank 1 by an ion exchange resin, etc., before it is supplied to the fuel processor 41.

In a case where the fuel cell system 100 is operated for the first time after it has been installed, no water is stored in the first water tank 1. Therefore, a service person who installed the fuel cell system 100 performs a water filling step, in which the water supply unit 2 is activated to supply tap water (also referred to as "city water") to the first water tank 1, from a tap water pipe or the like, via a water supply passage 21. The water filling step will be described in detail later.

There is disposed a water discharge unit 3 in the water discharge passage 31, to discharge water from inside of the first water tank 1 to a sewage line or the like via the water discharge passage 31, when the water in the first water tank 1 exceeds a specified amount. One end of the water discharge passage 31 is connected to the water drain port formed in the first water tank 1, while the other end thereof is connected to a pipe leading to the sewage line.

Next, the components in the fuel cell system 100 will be described in detail.

A controller 10 causes the raw material gas supply unit 4 to be activated and deactivated and increase or decrease its output. For example, the raw material gas supply unit 4 pressurizes the natural gas, and supplies the pressurized natural gas to the fuel processor 41. That is, the raw material gas refers to a gas or a liquid containing at least hydrocarbon such as the natural gas or LPG.

The combustor 42 may be accommodated into the fuel processor 41 or placed outside of the fuel processor 41. The combustor 42 is supplied with at least the off-fuel-gas. Alternatively, the combustor 42 may be directly supplied with the raw material gas. With reference to FIG. 2, a configuration of the fuel processor 41 and the combustor 42 will be further described.

As shown in FIG. 2, the fuel processor 41 has a cylindrical shape, and includes a first tube 81, a second tube 82, and a third tube 83 which are placed concentrically with each other. The electric heater 50 is provided around an outer periphery of the first tube 81.

A reforming catalyst 84 is placed in a lower portion of a tubular space defined by the second tube 82 and the third tube 83. The combustor 42 is placed inward relative to the third tube 83, i.e., inward relative to the reforming catalyst 84. In a space between the combustor 42 and the third tube 83, there is formed a flue gas passage through which the flue gas generated by the combustion performed in the combustor 42 flows.

Furthermore, a shift catalyst 85 and an oxidation catalyst 86 are placed in an upper portion of a tubular space defined by the first tube 81 and the second tube 82. It should be noted that the second tube 82 is formed not to contact a bottom surface of the fuel processor 41 so that a lower portion of the tubular space defined by the first tube 81 and the second tube 82 is communicated with the space defined by the second tube 82 and the third tube 83.

The controller 10 controls the whole fuel cell system 100. Specifically, the controller 10 controls activation, stop, and output of at least the water supply unit 2, the water discharge unit 3, the raw material gas supply unit 4, the reforming water supply unit 5, the electric heater 50, the air supply unit 61, the inverter 62, and the cooling water circulation unit 73. The controller 10 may be constructed by a single controller or a plurality of controllers.

The water discharge unit (first valve) 3 may be configured in any way so long as it is able to close the water discharge passage 31 to inhibit the water in the first water tank 1, i.e., liquid from flowing through the water discharge passage 31. The water discharge unit 3 is not limited to a water discharge pump, but may be, for example, valve, which merely opens and closes the water discharge passage 31.

Instead of providing the water discharge unit 3 in the water discharge passage 31, the water discharge passage 31 may be provided with a water filling structure. That is, the water discharge passage 31 may be configured such that its upstream end is located at a lower side in a vertical direction relative to its downstream end, and a level difference between a vertical lowest point of the water discharge passage 31 and the downstream end of the water discharge passage 31 becomes a water head difference which is equal to or higher than a highest pressure applied to the first water tank 1. This allows the water discharge passage 31 to be filled with water without providing the water discharge unit 3.

The first water tank 1 is provided with water filling detectors configured to detect that at least one of the water drain port 76 and the water discharge passage 31 is filled with water. As examples of the water filling detectors, there are a water level detector for detecting a water level inside of the first water tank 1, a flow detector for detecting a flow rate of the water supplied to the first water tank 1, and a water pressure detector for detecting a water pressure inside of the first water tank 1. In Embodiment 1, a water level detector 11 is used as the water filling detector.

Next, the operation method of the fuel cell system will be described in detail with reference to FIGS. 3 and 4.

The fuel cell system 100 is installed for a customer such as home, by the service person, etc. After the fuel cell system 100 has been installed, test operation (run) of the fuel cell system 100 is carried out by the service person, to check whether or not it is operated properly.

In the test operation and actual power generation, there are a start-up step of making preparation required for performing power generation in the fuel cell stack 60, a power generation step of actually generating electric power in the fuel cell stack 60 after the start-up step, a shut-down step performed after the power generation step, and a standby step from the shut-down step until the start-up step. The fuel cell system 100 of the present invention has features in the start-up step, especially the start-up step during the test operation. The power generation step, the shut-down step and the standby step are similar to those of the conventional examples and will not be described in repetition.

The start-up step during the test operation will be described in detail.

When the service person operates a remote controller or the controller 10 of the fuel cell system 100 to execute the test operation mode, firstly, the controller 10 activates the water supply unit 2, to start supplying of the tap water to inside of the first water tank 1, to start the water filling step (step S100). At this time, the controller 10 starts supplying of the electric power to the electric heater 50, to start heating of the fuel processor 41 by the electric heater 50 (step S101). If the water discharge unit 3 is not closed, the controller 10 closes the water discharge unit 3 before the water supply unit 2 is activated.

When the water level detector 11 detects a first water level at which at least one of the water drain port 76 and a portion of the water discharge passage 31 which is between the water drain port 76 and the water discharge unit 3 is filled with water, it sends to the controller 10, a signal indicating that the first water level has been detected (Yes in step S102). Receiving this signal, the controller 10 causes the raw material gas supply unit 4 to start operation to start supplying of the raw material gas to the fuel processor 41. At this time, the fuel processor 4 has not been heated adequately yet. In this state, the raw material gas has not been reformed sufficiently yet in the fuel processor 41, and carbon monoxide has not been removed sufficiently yet in the fuel processor 41. Because of this, the raw material gas which has not been reformed sufficiently flows through a bypass passage (not shown in FIG. 1), and is supplied to the combustor 42 via the first water tank 1 by bypassing the fuel cell stack 60. In addition, the combustor 42 is supplied with combustion air from an air supply unit (not shown). The controller 10 causes the combustor 42 to ignite the raw material gas by an igniter, or the like. (step S103).

Then, when the controller 10 detects that the fuel processor 41 has reached a first temperature at which the reforming reaction and a reaction for removing carbon monoxide (e.g., water shift reaction, selective oxidation reaction) proceeds adequately, and the water filling step is completed (Yes in step S104), it terminates the start-up step, and shifts to the power generation step (step S105). The power generation step is started by supplying the fuel gas which has been reformed and from which carbon monoxide has been removed in the fuel processor 41, to the fuel gas passage in the fuel cell stack 60.

Then, when the power generation step is completed (Yes in step S106), the controller 10 starts the shut-down step (step S107). Then, when the temperature of the fuel processor 41 has been lowered to a predetermined temperature, the controller 10 completes the shut-down step (step S108), and terminates the test operation mode.

Thus, in accordance with the fuel cell system 100 of the present embodiment, if the water level detector detects the first water level in the water filling step, supplying of the raw material gas starts and the combustor 42 starts performing combustion to heat the fuel processor 41, even when the water filling step is not completed. This makes it possible to reduce a time that passes until the test operation is completed as compared to the conventional example. The first water level refers to a water level at which at least one of the water drain port 76 and the portion of the water discharge passage 31 which is between the water drain port 76 and the water discharge unit 3 is filled with water. Therefore, the raw material gas supplied to the first water tank 1 does not leak to outside the fuel cell system 100, for example, a sewage line, via the water discharge passage 31 and the water discharge unit 3, which can ensure safety. Especially, the water discharge unit 3 serves to block the flow of water (liquid). Typically, it is difficult to perfectly block the flow of the gas by the water discharge unit 3. However, in the fuel cell system 100 of Embodiment 1, the test operation is carried out efficiently in view of such a characteristic of the water discharge unit 3. As a result, it becomes possible to carry out the test operation which ensures safety and efficiency.

Although in Embodiment 1, the first water tank 1 is a single water tank, it may be divided into plural parts.

Embodiment 2

A fuel cell system according to Embodiment 2 of the present invention comprises a fuel processor for generating a fuel gas through a reforming reaction between a raw material gas and water, a fuel cell stack for generating electric power using the fuel gas generated in the fuel processor and an oxidizing gas, a first water tank for storing water used in at least a reforming reaction in the fuel processor, a combustor for combusting a combustible gas supplied via the first water tank to heat the fuel processor, a water discharge passage connected to a water drain port formed in the first water tank to discharge the water from inside of the first water tank, a water filling detector configured to detect that at least one of the water drain port and the water discharge passage is filled with water, a water supply unit for supplying the water to the first water tank, and a controller configured to, before power generation is performed in the fuel cell stack, execute a water filling step of supplying the water to the first water tank by activating the water supply unit, supply the combustible gas to the combustor via the first water tank, and cause the combustor to combust the combustible gas, when the water filling detector detects that at least one of the water drain port and the water discharge passage is filled with water, in the water filling step.

[Configuration of Fuel Cell System]

Figure 5:
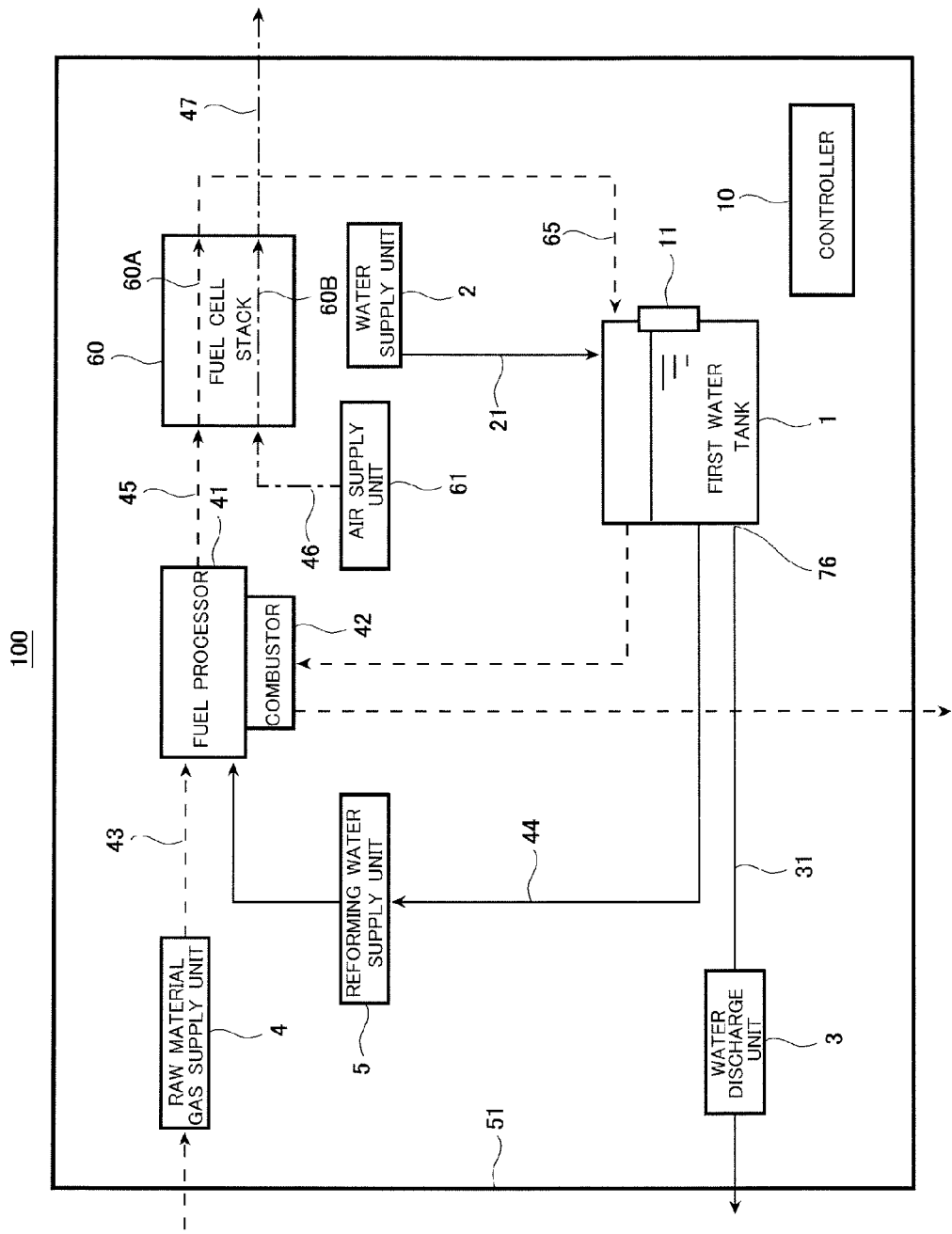
FIG. 5 is a view showing a schematic configuration of a fuel cell system according to Embodiment 2 of the present invention.

FIG. 5 is a view showing a schematic configuration of a fuel cell system according to Embodiment 2 of the present invention.

As shown in FIG. 5, the fuel cell system 100 according to Embodiment 2 comprises the fuel processor 41, the fuel cell stack 60, the combustor 42, the first water tank 1, the water supply unit 2, the water level detector 11, the water discharge passage 31, the water discharge unit 3, and the controller 10. These components are disposed inside of the casing 51. The controller 10 is configured to, before power generation is performed in the fuel cell stack 60, execute a water filling step of supplying the water to the first water tank 1 by activating the water supply unit 2, and supply a combustible gas to the combustor 42 via the first water tank 1 to cause the combustor 42 to combust the combustible gas, when the water filling detector 11 detects that at least one of the water drain port 76 and the water discharge passage 31 is filled with water, in the water filling step.

The raw material gas supply unit 4 is connected to the fuel processor 41 via a raw material gas supply passage 43. The raw material gas supply passage 43 is connected to a gas infrastructure line (not shown) of a natural gas. The raw material gas supply unit 4 includes a booster pump, and is able to adjust a flow rate of the raw material by controlling a current pulse or electric power, input to the booster pump, etc. Thus, the raw material gas supply unit 4 is activated and the raw material gas is supplied to the fuel processor 41 via the raw material gas supply passage 43.

As the raw material gas supply unit 4, a needle valve may be provided at a downstream side of the booster pump in addition to the booster pump, to finely control the amount of the supplied raw material. In a case where a supply gas pressure in the gas infrastructure line is high, the raw material gas supply unit 4 may consist of the needle valve (flow control valve) without providing the booster pump in the raw material gas supply unit 4 for boosting a gas pressure.

The first water tank 1 is connected to the fuel processor 41 via the reforming water supply passage 44. The reforming water supply unit 5 is provided in a portion of the reforming water supply passage 44. An upstream end of the reforming water supply passage 44 is connected to the first water tank 1 in a location above (in the vertical direction) the water drain port 76 as will be described later. A water purifier including an ion exchange resin for purifying the water flowing through the reforming water supply passage 44 is provided in a portion of the reforming water supply passage 44 (not shown).

The reforming water supply unit 5 may be configured in any way so long as it is able to supply the water with an adjusted flow rate, and may be, for example, a flow adjusting unit for adjusting a flow rate of the water. The flow adjusting unit may be constituted by a flow control valve single unit, a pump single unit, or a combination of the pump and the flow control valve. Thus, by activating the reforming water supply unit 5, the water is supplied as the water used for the reforming reaction, from inside of the first water tank 1 to the fuel processor 41, via the reforming water supply passage 44.

The fuel processor 41 includes a reformer (not shown) which has a reforming catalyst (not shown) which allows the reforming reaction between the raw material gas and the water (steam) to proceed, to generate a hydrogen-containing gas. As the reforming catalyst, any substances may be used so long as it is able to catalyze, for example, the steam reforming reaction for generating the hydrogen-containing gas from the raw material and the steam. For example, a ruthenium based catalyst carrying ruthenium (Ru) on a catalyst carrier such as alumina, a nickel based catalyst carrying nickel (Ni) on a similar catalyst carrier, etc., may be used as the reforming catalyst.

The reformer generates the hydrogen-containing gas through the reforming reaction between the raw material gas and the water (steam). The generated hydrogen-containing gas flows as the fuel gas through the fuel gas supply passage 45 and is supplied to a fuel gas passage 60A of the fuel cell stack 60.

Although in Embodiment 2, the hydrogen-containing gas generated in the reformer is sent out as the fuel gas to the fuel cell stack 60, the present invention is not limited to this. The fuel processor 41 may include a shift converter having a shift catalyst (e.g., copper-zinc based catalyst) for reducing carbon monoxide in the hydrogen-containing gas sent out from the reformer, and a carbon monoxide reducing unit having an oxidation catalyst (e.g., ruthenium based catalyst) or a methanation catalyst (e.g., ruthenium based catalyst), and may be configured to send out the hydrogen-containing gas having passed through these units, to the fuel gas passage 60A.

The fuel processor 41 is provided with the combustor 42. The combustor 42 may be constituted by a burner, a combustion catalyst, etc. The combustor 42 is supplied with the off-fuel-gas as combustion fuel from the fuel cell stack 60, through the off-fuel-gas passage 65. A combustion fan (not shown) is connected to the combustor 42 via an air supply passage (not shown). The combustion fan may be configured in any way so long as it is able to supply the combustion air to the combustor 42, and may be constituted by, for example, a fan unit such as a fan or a blower.

The combustor 42 combusts the off-fuel-gas and the combustion air supplied thereto to generate the flue gas and heat. The flue gas generated in the combustor 42 heats the reformer, or the like and is thereafter discharged to outside of the fuel cell system 100 (casing 51).

The air supply unit 61 is connected to the oxidizing gas passage (air supply passage) 60B in the fuel cell stack 60, via an air supply passage 46. The air supply unit 61 may be configured in any way so long as it is able to supply the oxidizing gas (air) to the oxidizing gas passage 60B while adjusting its flow rate. For example, the air supply unit 61 may be constituted by, for example, a fan unit such as a fan or a blower.

The fuel cell stack 60 includes the anode (not shown) and the cathode (not shown). In the fuel cell stack 60, the fuel gas supplied to the fuel gas passage 60A is supplied to the anode while flowing through the fuel gas passage 60A. Also, in the fuel cell stack 60, the oxidizing gas supplied to the oxidizing gas passage 60B is supplied to the cathode while flowing through the oxidizing gas passage 60B. The fuel gas supplied to the anode and the oxidizing gas supplied to the cathode are reacted with each other to generate electricity and heat.

As the fuel cell stack 60, a known fuel cell, such as a polymer electrolyte fuel cell or a solid fuel cell may be used. The configuration of the fuel cell stack 60 is configured like a general fuel cell stack and will not be described in detail.

The off-oxidizing-gas which is not used in the fuel cell stack 60 is discharged to outside of the fuel cell system 100 (casing 51) via an off-oxidizing-gas discharge passage 47. Also, the off-fuel-gas which is not used in the fuel cell stack 60 is supplied to the combustor 42 via the off-fuel-gas passage 65, as described above.

The first water tank 1 is disposed in a portion of the off-fuel-gas passage 65. The first water tank 1 stores the water generated by condensation of the steam contained in the off-fuel-gas while the off-fuel-gas is flowing through the off-fuel-gas passage 65.

A downstream end of the water supply passage 21 is connected to the first water tank 1, while an upstream end of the water supply passage 21 is connected to the tap water. The water supply unit 2 is provided in a portion of the water supply passage 21. The water supply unit 2 may be configured in any way so long as it is able to send out the water to the first water tank 1. As the water supply unit 2, for example, a pump may be used, or the pump and an on-off valve for permitting/inhibiting the flow of the water inside of the water supply passage 21, may be used. As the water supply unit 2, a cartridge tank storing water inside thereof may be used.

Although in Embodiment 2, the water supply unit 2 is provided in the water supply passage 21, the present invention is not limited to this. The water supply unit 2 may be provided in another passage (e.g., passage connecting the cooling water tank 71 to the first water tank 1, etc.) and/or another tank such as the cooling water tank 71, etc., and may be configured to send out the water to the first water tank 1, via the passage, or the like.

The first water tank 1 is provided with the water drain port 76 for draining the water from inside of the first water tank 1. The water discharge passage 31 is connected to the water drain port 76. The water discharge unit 3 is provided in a portion of the water discharge passage 31. The water discharge unit 3 may be configured in any way so long as it is able to permit/inhibit the flow of the water in the water discharge passage 31. The water discharge unit 3 may be constituted by, for example, a pump, an on-off valve, or a combination of the pump and the on-off valve. By activating the water discharge unit 3, the water is discharged from inside of the first water tank 1 to outside of the fuel cell system 100 (casing 51).

The first water tank 1 is provided with the water level detector 11. The water level detector 11 may be configured in any way so long as it is able to detect the water level inside of the first water tank 1. For example, the water level detector 11 may be a float type water level sensor, an optical interface type water level sensor, an ultrasonic type water level sensor, an electrode type water level sensor, a pressure type water level sensor, etc., may be used. The water level detector 11 may output the detected water level to the controller 10.

The controller 10 may be configured in any way so long as it is a device for controlling the components in the fuel cell system 100. The controller 10 includes a processor section represented by a microprocessor, a CPU, etc., and a memory section constituted by a memory, etc., which contains programs for executing control operations. The processor section of the controller 10 reads out specified control programs stored in the memory section and executes them, thus processing these information and performing control relating to the fuel cell system 100 including the control therefor.

The controller 10 may consist of a single controller or may be constituted by a controller group composed of a plurality of controllers that cooperate with each other to control the fuel cell system 100. Or, the controller 10 may be constituted by a microcontroller, a MPU, a PLC (Programmable Logic Controller), a logic circuit, etc.

[Operation of Fuel Cell System]

Next, the operation of the fuel cell system 100 according to Embodiment 2 will be described with reference to FIGS. 5 to 7.

As described above, in the case where the service person or the like installs the fuel cell system 100, carries out maintenance of the fuel cell system 100, etc., the service person or the like performs the water filling step for supplying the water to the first water tank 1, or the like, and the test operation. In a case where the fuel cell system 100 is not used for a long period of time, the water stored in the first water tank 1 or the like is discharged to outside of the fuel cell system 100. Therefore, when the fuel cell system 100 is re-used, the water filling step and the test operation are performed.

Although in the present embodiment, the water filling step is defined as supplying of the water to the first water tank 1 or the like, the test operation (run) is defined as performing a power generation operation in the fuel cell system 100, and the test operation mode is defined as the water filling step and the test operation, the water filling step and the power generation operation may be collectively interpreted as the test operation. Hereinafter, the test operation mode will be specifically described.

Figure 6:
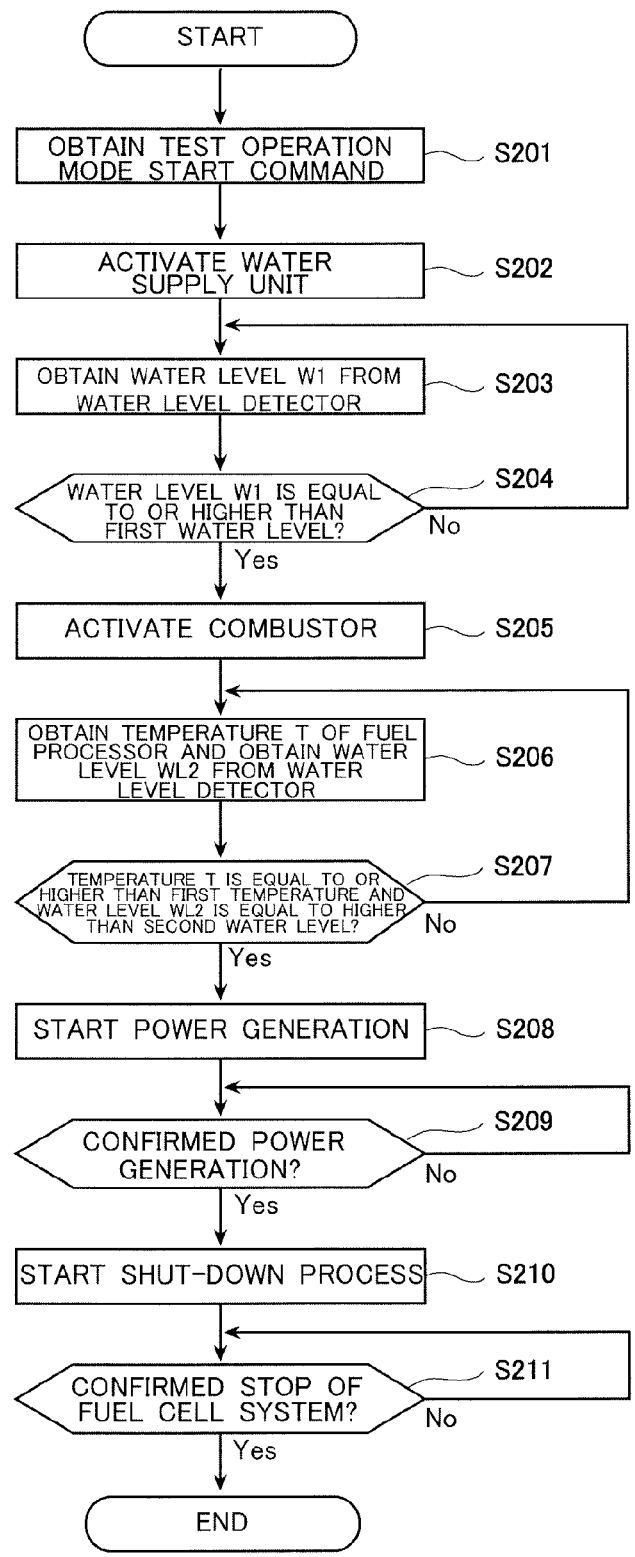
FIG. 6 is a flowchart showing an operation (water filling step and test operation (run)) of the fuel cell system according to Embodiment 2.

FIG. 6 is a flowchart showing the operation (water filling step and test operation) of the fuel cell system 100 according to Embodiment 2.

As shown in FIG. 6, for example, it is assumed that the service person or the like installs the fuel cell system 100 and manipulates a remote controller (not shown) to start the test operation mode. Thereupon, the controller 10 obtains a test operation mode start command (step S201). Then, the controller 10 activates the water supply unit 2 to start the water filling step (step S202).

Then, the controller 10 obtains a water level WL1 inside of the first water tank 1 detected by the water level detector 11, from the water level detector 11 (step S203). The controller 10 determines whether or not the obtained water level WL1 is equal to or higher than a preset first water level (step S204). The first water level is defined as a water level at which at least one of the water drain port 76 of the first water tank 1 and a portion of the water discharge passage 31 which is between the water drain port 76 and the water discharge unit 3 is filled with the water. More specifically, the first water level is defined as a water level at which at least one of the water drain port 76 of the first water tank 1 and a portion of the water discharge passage 31 which is between the water drain port 76 and the water discharge unit 3, in a state in which the water discharge unit 3 is closed, is filled with the water.

When the controller 10 determines that the water level WL1 obtained in step S203 is lower than the first water level (No in step S204), it returns to step S203, and repeats step S203 and step S204, until the water level WL1 becomes equal to or higher than the first water level. On the other hand, when the controller 10 determines that the water level WL1 obtained in step S203 is equal to or higher than the first water level (Yes in step S204), it move to step S205.

If the water level detector 11 does not detect the first water level even when the preset first time has passed after the water supply unit 2 is activated, the controller 10 may stop the water supply unit 2, and terminate the present program. This is because if the water level detector 11 does not detect the first water level even when the water supply unit 2 is activated for the first time, it is estimated that the first water tank 1, the water supply passage 21, or the like is damaged. The first time is found by an experiment, etc. The first time may be, for example, time that passes from a state in which no water is stored in the first water tank 1 until the water level inside of the first water tank 1 becomes equal or higher than the first water level, by activating the water supply unit 2.

In step S205, the controller 10 activates the combustor 42. Specifically, the controller 10 activates the raw material gas supply unit 4 to supply the raw material gas as the combustion fuel to the combustor 42, via the raw material gas supply passage 43, the fuel gas supply passage 45, the bypass passage (not shown in FIG. 5), and the off-fuel-gas passage 65. In addition, the controller 10 activates the air supply unit (not shown in FIG. 5) to supply the combustion air to the combustor 42. In the combustor 42, an ignition device such as an igniter is activated, and the combustion fuel and the combustion air are combusted to generate a high-temperature flue gas. The high-temperature flue gas heats the reformer or the like inside of the fuel processor 41 and is thereafter discharged to outside of the fuel cell system 100 (casing 51).

The bypass passage is a passage connecting the fuel gas supply passage 45 to the off-fuel-gas passage 65. In Embodiment 2, the bypass passage connects the fuel gas supply passage 45 to a portion of the off-fuel-gas passage 65 which is upstream of the first water tank 1.

Although in Embodiment 2, the raw material gas supply unit 4 is activated to supply the combustion fuel to the combustor 42, the present invention is not limited to this. The combustor 42 may be directly provided with a fuel supply unit and a combustion passage to supply the combustion fuel.

Then, the controller 10 obtains a temperature t of the fuel processor 41 (e.g., temperature of reformer) from a temperature detector (not shown in FIG. 5) attached to the fuel processor 41, and obtains a water level (water level WL2) inside of the first water tank 1 again, from the water level detector 11 (step S206). The controller 10 determines whether or not the temperature t is equal to or higher than a first temperature and the water level WL2 is equal to or higher than a second water level (step S207).

The first temperature can be suitably set based on the detected temperature (e.g., temperature of reformer, temperature of the shift converter, etc.), and the kind of the fuel cell used (e.g., polymer electrolyte fuel cell, solid oxide fuel cell, etc.). For example, in a case where the temperature of the reformer is detected and the fuel cell used is the polymer electrolyte fuel cell, the first temperature may be set to 650 degrees C. to 700 degrees C.

The second water level is defined as a water level inside of the first water tank 1 at a time point when filling of the water to the first water tank 1 or the like is finished, and is preset as desired. For example, the second water level may be a water level at which the first water tank 1 is fully filled with the water.

When the controller 10 determines that the temperature t obtained in step S206 is lower than the first temperature, or the water level WL2 obtained in step S206 is lower than the second water level (No in step S207), it returns to step S206, and repeats step S206 and step S207, until the temperature t becomes equal to or higher than the first temperature and the water level WL2 becomes equal to or higher than the second water level. On the other hand, when the controller 10 determines that the temperature t becomes equal to or higher than the first temperature, and the water level WL2 becomes equal to or higher than the second water level (Yes in step S207), it moves to step S208. If the water level WL2 becomes equal to or higher than the second water level before the temperature t becomes equal to or higher than the first temperature, the controller 10 stops the water supply unit 2, of course.

In step S208, the controller 10 causes the fuel cell system 100 to start power generation. Specifically, the controller 10 supplies the electric power to the home power load, etc., from the inverter 62 (not shown in FIG. 5). Then, the controller 10 confirms that fuel cell system 100 is generating electric power (Yes in step S209), and then starts shut-down process of the fuel cell system 100 (step S210).

The controller 10 can confirm that fuel cell system 100 is generating electric power, based on, for example, the fact that supplying of the electric power from the inverter 62 to the home power load, etc., starts, a current meter attached to a wire connecting the inverter 62 to the power supply utility detects a current, etc. The shut-down process of the fuel cell system 100 is performed like the shut-down process of a general fuel cell system (stop of the raw material gas supply unit 4, the reforming water supply unit 5, etc.), and will not be described in detail.

Then, when the controller 10 confirms the shut-down of the fuel cell system 100 (step S211), it terminates the present program (test operation mode in the fuel cell system 100).

Next, a description will be given of the power generation operation of the fuel cell system 100 performed after installation or maintenance of the fuel cell system 100, with reference to FIG. 7.

Figure 7:
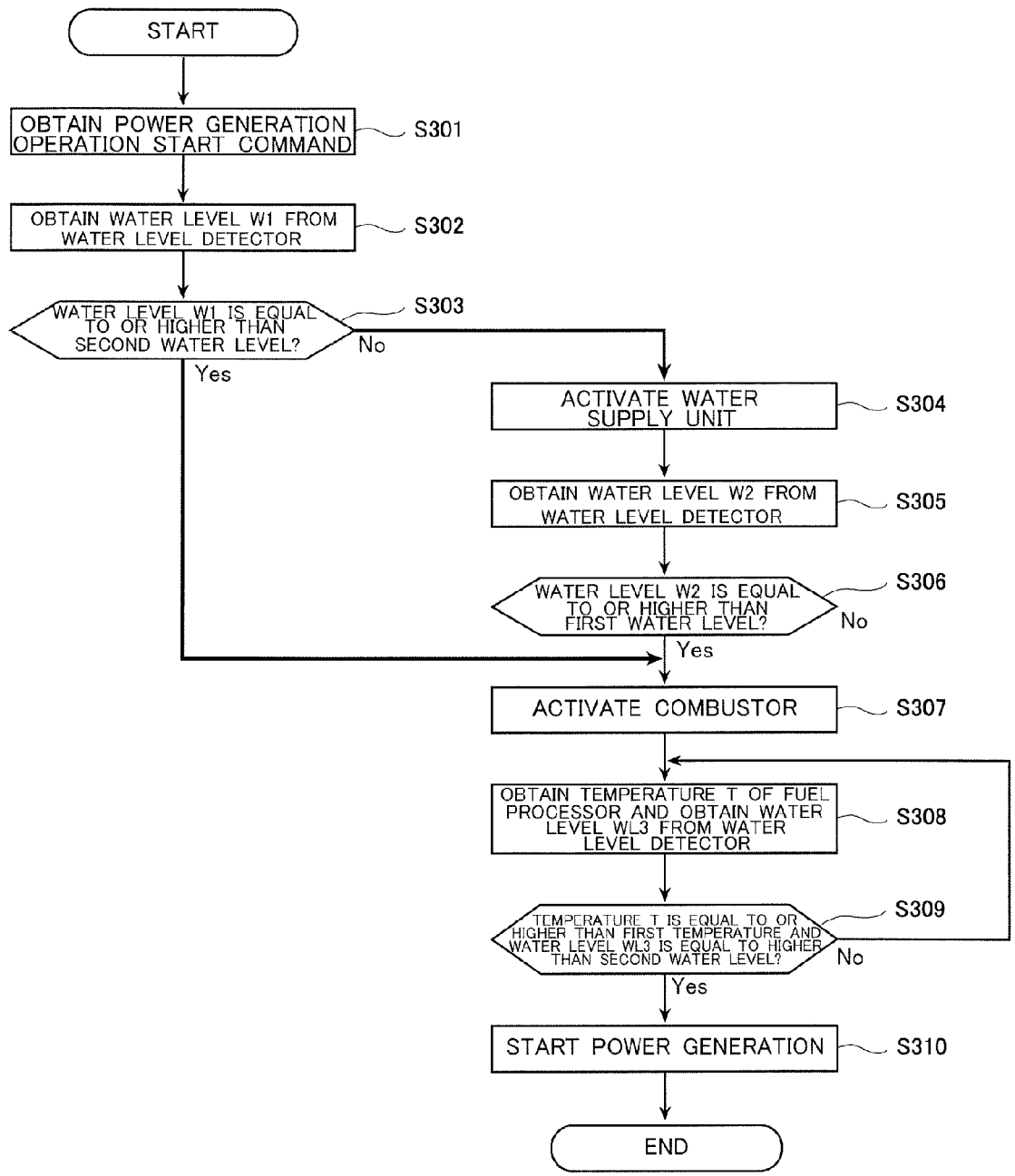
FIG. 7 is a flowchart showing an operation (power generation operation; start-up step and power generation step) of the fuel cell system according to Embodiment 2.

FIG. 7 is a flowchart showing the operation (power generation operation; start-up step and power generation step) of the fuel cell system 100 according to Embodiment 2.

As shown in FIG. 7, the controller 10 obtains a power generation operation command of the fuel cell system 100 (step S301). Then, the controller 10 obtains the water level WL1 inside of the first water tank 1 detected by the water level detector 11, from the water level detector 11 (step S302). The controller 10 determines whether or not the obtained water level WL1 is equal to or higher than a preset second water level (step S303). The power generation operation start command of the fuel cell system 100 is output, in a case where a preset start-up time of the fuel cell system 100 is reached, a case where a user manipulates a remote controller (not shown) to command the fuel cell system 101 to start power generation, etc.

When the controller 10 determines that the water level WL1 obtained in step S302 is equal to or higher than the second water level (Yes in step S303), it moves to step S308 as will be described later. This is because in this case, sufficient water exists inside of the first water tank 1, and therefore the normal start-up step can be performed. On the other hand, when the controller 10 determines that the water level WL1 obtained in step S302 is lower than the second water level (No in step S303), it moves to step S304.

In step S304, the controller 10 activates the water supply unit 2 to supply the water to the first water tank 1. Then, the controller 10 obtains again the water level WL2 inside of the first water tank 1 which is detected by the water level detector 11, from the water level detector 11 (step S305), and determines whether or not the obtained water level WL2 is equal to or higher than a preset first water level (step S306).

When the controller 10 determines that the water level WL2 obtained in step S305 is lower than the first water level (No in step S306), it returns to step S305 and repeats step S305 and step S306, until the water level WL1 becomes equal to or higher than the first water level. On the other hand, when the controller 10 determines that the water level WL2 obtained in step S305 is equal to or higher than the first water level (Yes in step S306), it move to step S307.

If the water level detector 11 does not detect the first water level even when the preset first time has passed after the water supply unit 2 is activated, the controller 10 may stop the water supply unit 2, and terminate the present program. This is because if the water level detector 11 does not detect the first water level even when the water supply unit 2 is activated for the first time, it is estimated that the first water tank 1, the water supply passage 21, or the like is damaged. The first time is found by an experiment, etc. The first time may be, for example, time that passes from a state in which no water is stored in the first water tank 1 until the water level inside of the first water tank 1 becomes equal or higher than the first water level, by activating the water supply unit 2.

In step S307, the controller 10 activates the combustor 42. Then, the controller 10 obtains the temperature t of the fuel processor 41 (e.g., temperature of reformer) from the temperature detector (not shown in FIG. 5) attached to the fuel processor 41, and obtains a water level (water level WL3) inside of the first water tank 1 again, from the water level detector 11 (step S308). The controller 10 determines whether or not the temperature t is equal to or higher than the first temperature and the water level WL3 is equal to or higher than the second water level (step S309).

When the controller 10 determines that the temperature t obtained in step S308 is lower than the first temperature, or the water level WL2 obtained in step S308 is lower than the second water level (No in step S309), it returns to step S308, and repeats step S308 and step S309, until the temperature t becomes equal to or higher than the first temperature and the water level WL3 becomes equal to or higher than the second water level. On the other hand, when the controller 10 determines that the temperature t becomes equal to or higher than the first temperature, or the water level WL3 becomes equal to or higher than the second water level (Yes in step S309), it moves to step S310. If the water level WL2 becomes equal to or higher than the second water level before the temperature t becomes equal to or higher than the first temperature, the controller 10 stops the water supply unit 2, of course.

In step S310, the controller 10 causes the fuel cell system 100 to start power generation, and terminates the present program.

Thus, the fuel cell system 100 according to Embodiment 2 configured as described above, can achieve the same advantages as those of the fuel cell system 100 according to Embodiment 1. In the fuel cell system 100 according to Embodiment 2, in the case where the power generation is carried out, the water is supplied to the first water tank 1 if the water inside of the first water tank 1 is deficient. If the water level detector 11 detects the first water level, supplying of the raw material gas starts and the combustor 42 starts combustion to heat the fuel processor 41, even when supplying of the water to the first water tank 1 is not completed. This makes it possible to reduce time required from the start-up step to the power generation step (time that lapses from when the fuel cell system 100 is started-up until the power generation operation is performed), as compared to the conventional fuel cell system.

Embodiment 3

In a fuel cell system according to Embodiment 3 of the present invention, the water supply unit is configured to supply the water to the first water tank via the second water tank provided upstream of the first water tank.

[Configuration of Fuel Cell System]

Figure 8:
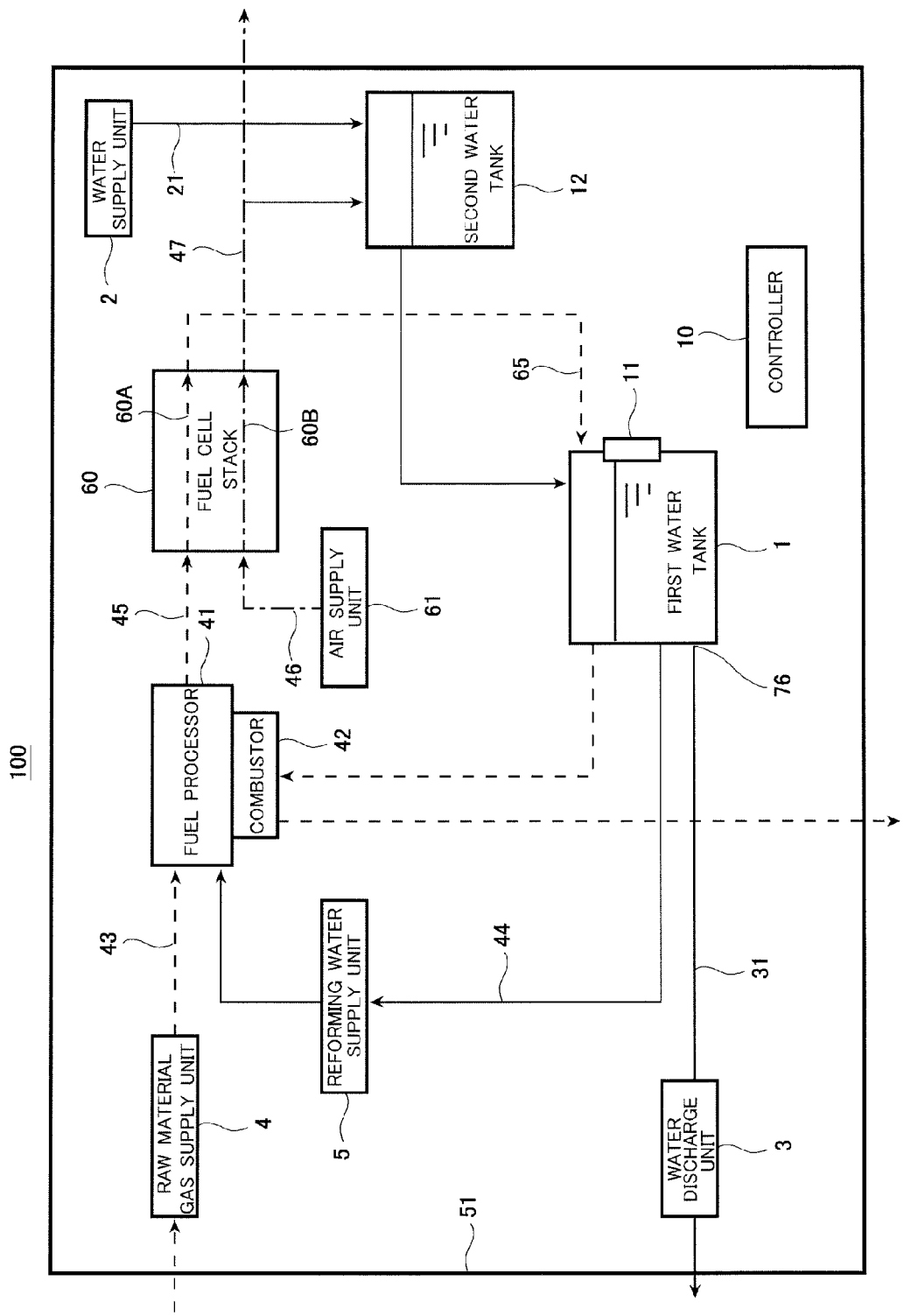
FIG. 8 is a view showing a schematic configuration of a fuel cell system according to Embodiment 3 of the present invention.

FIG. 8 is a view showing a schematic configuration of the fuel cell system according to Embodiment 3 of the present invention.

As shown in FIG. 8, the fuel cell system 100 according to Embodiment 3 has basically the same configuration as that of the fuel cell system 100 according to Embodiment 2 except that a second water tank 12 is provided. Specifically, the second water tank 12 is provided on the water supply passage 21 in a location downstream of the water supply unit 2. The second water tank 12 is configured to store a moisture (water) contained in the off-oxidizing-gas discharged from the fuel cell stack 60.

In this configuration, the water is supplied from the water supply unit 2 to the first water tank 1 via the second water tank 12. Although in the fuel cell system 100 according to Embodiment 3, the water is supplied from the water supply unit 2 to the first water tank 1 via the second water tank 12, the present invention is not limited to this. The water may be supplied from the water supply unit 2 to the first water tank 1 via the second water tank 12 and the cooling water tank 71 (see FIG. 1).

The fuel cell system 100 according to Embodiment 3 configured as described above, can achieve the same advantages as those of the fuel cell system 100 according to Embodiment 2.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A fuel cell system and an operation method thereof of the present invention are capable of performing a water filling step and a power generation operation (test operation) in a shorter time and more efficiently, and therefore are useful as fuel cell systems for household uses, fuel cell systems for business purposes, etc., including a polymer electrolyte fuel cell, and a solid oxide fuel cell.

REFERENCE SIGNS LIST 1 first water tank
2 water supply unit
3 water discharge unit
4 raw material gas supply unit
5 reforming water supply unit
6 inverter 10 controller
11 water level detector
12 second water tank
21 water supply passage
31 water discharge passage
41 fuel processor
42 combustor
43 raw material gas supply passage
44 reforming water supply passage
45 fuel gas supply passage
46 air supply passage
47 off-oxidizing-gas discharge passage
50 electric heater
51 casing
60 fuel cell stack
60A fuel gas passage
60B oxidizing gas passage
61 air supply unit
62 inverter
65 off-fuel-gas passage
67 first exhaust port
70 second exhaust port
71 cooling water tank
72 cooling water circulation passage
73 cooling water circulation unit
74 hot water storage tank
75 hot water circulation passage
76 water drain port
77 heat exchanger
81 first tube
82 second tube
83 third tube
84 reforming catalyst
85 shift catalyst
86 oxidation catalyst
100 fuel cell system

The invention claimed is:

1. A fuel cell system comprising:
a fuel processor for generating a fuel gas through a reforming reaction between a raw material gas and water;
a fuel cell stack for generating electric power using the fuel gas generated in the fuel processor and an oxidizing gas;
a first water tank for storing water used in at least a reforming reaction in the fuel processor;
a combustor for combusting a combustible gas supplied via the first water tank to heat the fuel processor;
a water discharge passage connected to a water drain port formed in the first water tank to discharge the water from inside of the first water tank to outside;
a water filling detector configured to detect that at least one of the water drain port and the water discharge passage is filled with the water to prevent a gas from leaking to outside through the water drain port;
a water supply unit for supplying the water to the first water tank; and
a controller configured to,
before power generation is performed in the fuel cell stack, in a case where an operation is started in a state in which the water inside the first water tank is deficient,
execute a water filling step of supplying the water to the first water tank by activating the water supply unit, and supply the combustible gas to the combustor via the first water tank and cause the combustor to combust the combustible gas, while supplying the water to the first water tank, and continue to supply the water to the first water tank until filling of the water is finished, when the water filling detector detects that at least one of the water drain port and the water discharge passage is filled with water to prevent the gas from leaking to outside through the water drain port, in the middle of the water filling step.

2. The fuel cell system according to claim 1, wherein the controller stops the water supply unit when the water filling detector does not detect that at least one of the water drain port and the water discharge passage is filled with the water, after the water supply unit is activated for first predetermined time.

3. The fuel cell system according to claim 1, wherein the water filling detector is at least one of a water level detector for detecting a water level inside of the first water tank, a flow detector for detecting a flow rate of the water supplied to the first water tank, and a water pressure detector for detecting a water pressure inside of the first water tank.

4. The fuel cell system according to claim 1,
wherein the water filling detector is a water level detector for detecting a water level inside of the first water tank; and
wherein the controller determines that at least one of the water drain port and the water discharge passage is filled with the water, when the water level detector detects a first predetermined water level.

5. The fuel cell system according to claim 1, further comprising:
a first valve provided in the water discharge passage;
wherein the controller supplies the combustible gas to the combustor via the first water tank and causes the combustor to combust the combustible gas, when the water filling detector detects that a portion of the water discharge passage which is upstream of the first valve, is filled with the water, in a state in which the first valve is closed.

6. The fuel cell system according to claim 1,
wherein the first water tank is configured to store a moisture in an off-fuel-gas which is a fuel gas discharged from the fuel cell stack, as the water used in at least the reforming reaction; and
wherein the combustor is configured to combust the off-fuel-gas from which the moisture has been removed.

7. The fuel cell system according to claim 1, wherein the controller causes the fuel cell stack to start power generation after the water filling step is completed.

8. The fuel cell system according to claim 1, further comprising:
a raw material gas supply unit for supplying a raw material gas to the fuel processor; and
an off-gas passage used to supply a gas discharged from the fuel cell stack to the combustor;
wherein the first water tank is provided on a portion of the off-gas passage; and
wherein the controller causes the raw material gas supply unit to be activated to supply the raw material gas to the combustor via the first water tank, when the water filling detector detects that at least one of the water drain port and the water discharge passage is filled with water.

9. The fuel cell system according to claim 1, wherein the water supply unit is configured to supply the water to the first water tank via a second water tank provided upstream of the first water tank.

10. The fuel cell system according to claim 1, further comprising:
- an electric heater disposed on an outer periphery of the fuel processor to heat the fuel processor;
- wherein the combustor is disposed inward relative to a reforming catalyst provided in the fuel processor; and
- wherein the controller causes electric power to be supplied to the electric heater when supplying of the water to the first water tank starts and before the combustor performs combustion.

11. The fuel cell system according to claim 1, further comprising:
- a reforming water supply passage connecting the fuel processor to the first water tank;
- wherein a connecting port at which the reforming water supply passage is connected to the water tank is positioned above the water drain port.

12. A method of operating a fuel cell system including:
- a fuel processor for generating a fuel gas through a reforming reaction between a raw material gas and water;
- a fuel cell stack for generating electric power using the fuel gas generated in the fuel processor and an oxidizing gas;
- a first water tank for storing water used in at least a reforming reaction in the fuel processor; and
- a combustor for combusting a combustible gas supplied via the first water tank to heat the fuel processor; the fuel cell system further including:
- a water discharge passage connected to a water drain port formed in the first water tank to discharge the water from inside of the first water tank to outside;
- a water supply unit for supplying the water to the first water tank; and
- a water filling detector configured to detect that at least one of the water drain port and the water discharge passage is filled with water to prevent a gas from leaking to outside through the water drain port;

the method comprising:

before power generation is performed in the fuel cell stack, in a case where an operation is started in a state in which the water inside the first water tank is deficient, executing a water filling step of supplying the water to the first water tank by activating the water supply unit, and supplying the combustible gas to the combustor via the first water tank to cause the combustor to combust the combustible gas, while supplying the water to the first water tank, and continuing to supply the water to the first water tank until filling of the water is finished, when the water filling detector detects that at least one of the water drain port and the water discharge passage is filled with the water, to prevent the gas from leaking to outside through the water drain port, in the middle of the water filling step.

* * * * *